Sept. 29, 1931.  A. OSWALD  1,825,122
OBJECTIVE FOR COLOR PHOTOGRAPHY
Filed March 23, 1925
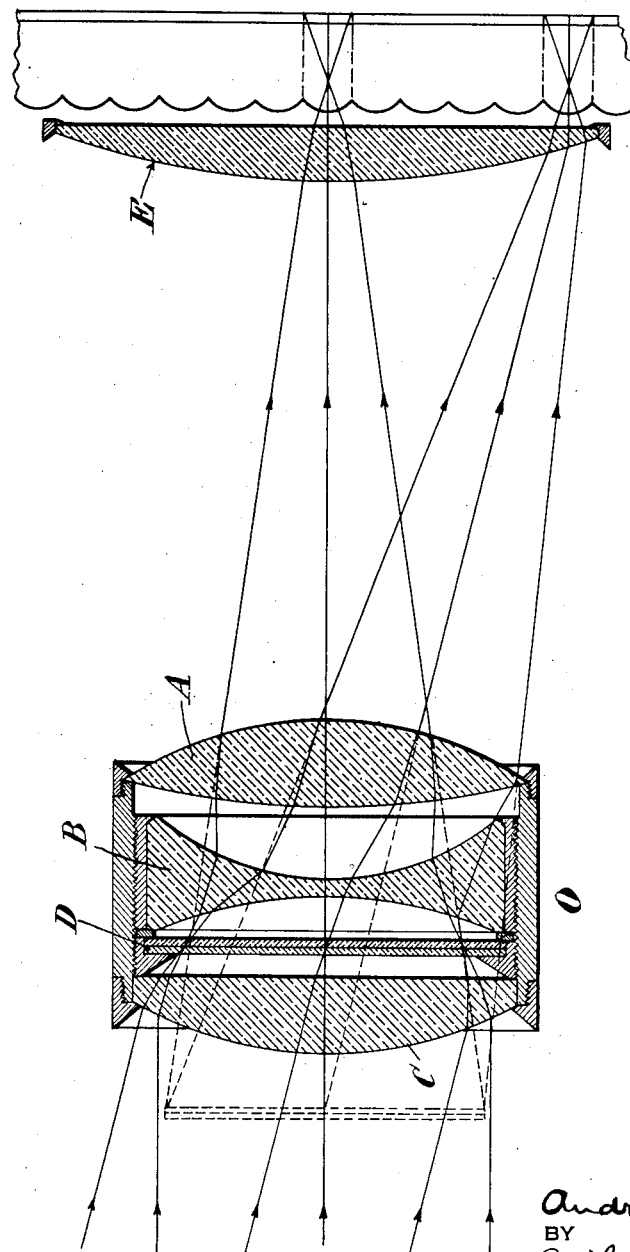
INVENTOR
Andre Oswald
BY
Arthur Wright
ATTORNEY Patented Sept. 29, 1931

1,825,122

UNITED STATES PATENT OFFICE

ANDRÉ OSWALD, OF PARIS, FRANCE, ASSIGNOR, BY MESNE ASSIGNMENTS, TO KELLER-DORIAN COLORFILM CORPORATION, OF NEW YORK, N. Y., A CORPORATION OF DELAWARE

OBJECTIVE FOR COLOR PHOTOGRAPHY

Application filed March 23, 1925, Serial No. 17,724, and in France February 7, 1925.

The processes for color photography based on the use of sensitized films goffered on their unsensitized side with a lenticular, spherical or cylindrical system, offer as to practical application multifarious difficulties. These difficulties arise from the fact that the various cells of the film work under different optical conditions according as they are positioned on the axis of the lens or at the edge of the field.

Endeavors have already been made to overcome the said difficulties by, for picture-taking, arranging very close to the film to be exposed, a collimating lens having simply a focus in the vicinity of the focus of the objective. Such a device, as characterized solely by the above indications, does not unfailingly correct the aforementioned drawbacks, since, in fact, in order to obtain proper and unfailing correction the lens must form with the objective an optical set perfectly defined.

My invention relates to a novel optical combination to constitute an objective for color picture taking, copying and projecting, through the use of which all the above enumerated drawbacks are eliminated.

In the accompanying drawing:

The figure shows an optical system established according to my invention.

In the figure the same reference letters denote the same parts, as hereinafter referred to.

In order to review in detail the characteristic conditions that have to be fulfilled by the optical combinations which are the object of my invention and in order to render their importance clearly apparent, it is first of all necessary to set forth the inconveniences attaching to the device at present in use.

Under good picture-taking conditions each lenticular element projects on the sensitized surface an extremely reduced image of a selecting filter.

It is, first of all, of the utmost necessity, in order to preserve the purity of the colors, that the images be quite sharp, so that the partitioning lines which will be photographed may define as bodily as possible the various colored regions.

Now, then, this condition is well nigh fulfilled as regards the lenticular elements situated in the vicinity of the axis of the objective used, but such is not the case as regards the marginal lenticular elements which give considerably off-centered images of the filter.

The resulting lack of sharpness of the marginal or secondary images of the filter is not compensated for, either during the subsequent operations of positive printing or during projection. On the contrary, each optical repetition of the images increases this lack of sharpness so that the defect ultimately becomes four times as great on projection. This partly accounts for the lack of purity of marginal colors which affects projections made by this process.

Still other serious inconveniences also arise from the difference in optical working of the marginal and of the central lenticular elements, to wit:

In order that the reconstitution of projected colors may be exact, all the regions on the film carrying the picture must reciprocally be represented in their turn, on projection, by images accurately superimposed in a single mass. This implies that the pupil of incidence of the projecting objective must be the same distance from the film as the pupil of emergence of the picture-taking objective. Practically speaking, projecting objectives must be used the focal length of which is about the same as the one of the picture-taking objective. This requirement is generally inconsistent with the distance at which the projection screens stand in halls, and with the size of such screens.

Another difficulty arising from the same cause is the necessity for perfect centering of the photographic negative or cliché on the axis of the projecting objective. A displacement of the center of the cliché in its plane respecting the optical axis displaces to the same extent the chromogene images respecting the selector film of projection and involves a diffusion of colors.

In the case of contact printing, the images of the filter on the original film are reproduced correctly as concerns the central elements and incorrectly as concerns the marginal elements.

In copying by means of a camera obscura and unit enlargement, the diaphragm filter must occupy the same position as to distance and have the same angular extent, respecting the two films, as in picture-taking, a requirement which leads to the use of objectives working for the same field with considerable aperture ratio, twice those of picture-taking objectives; whence imperfect copies are produced.

My invention relates to a novel optical combination for constituting objectives for picture-taking, copying and projecting by means of which all the above enumerated inconveniences are eliminated.

In principle it consists in providing an optical system in such a manner that the pupil of emergence of the combination (where the final image of the color filter is located) is removed an infinitum, or at any rate very far in front of the film so that all the difficulties appertaining to the position of the filter as to distance will be done away with and there will remain only angular questions to be considered, the solution of which as to geometrical optics then becomes quite easy.

Forms of objectives meeting this requirement can already be obtained by starting with present forms, as for example, a bi-convex lens A, a bi-concave lens B, a simple convex lens C and a diaphragm D, and by placing in the vicinity of their focal plane a lens E which will play the part of a collimator and the focal length of which is so arranged that the pupil of emergence of the original objective will be in the anterior focal plane of the lens E. This is indicated on the figure of the drawing wherein the pupil of emergence of the objective designated by O comprising the above convex lens, diaphragm, bi-concave lens and bi-convex lens is indicated to the left of the concavo-convex lens and wherein the said pupil of emergence coincides with the anterior focal plane or principal focus of the collimator lens E. The pupil of emergence of the objective O is the place where the image of the said diaphragm seems to the eye to be located, when the eye is positioned at the principal focus of the objective O to the right thereof, when looking at said diaphragm through said objective O. The preferred shape of this lens E is determined by the requirement of reducing to a minimum the distortion introduced thereby into the image.

The aberrations introduced by it, spherical aberration, aigrettes, astigmatism and curvature of the field are compensated by the de plano introduction of residual aberrations into the original objective.

For instance, the collimating lens introduces a forward curvature of the image substantially equal to $\varphi/\eta$; $\varphi$ denoting its power and $\eta$ the index of refraction of the material it is made of.

The original objective must therefore be so calculated as to offer a curvature in a backward direction equal to $\varphi \eta$. It must also offer a slight supercorrection of the spherical aberration and of the chromatic aberration.

As examples of embodiments of my invention I will indicate the following forms of objectives:

For picture taking I may use an anastigmatic objective constituted by a lens system made of of three spaced elements and by a collimating lens located in the vicinity of the focal plane of said objective, as above referred to. Persons skilled in the art are aware that in the case of anastigmatic objectives the curvature of the image surface follows Petzval's law—

$$-P = \Sigma \frac{\phi}{\eta}$$

and that in calculating these objectives in view of increasing the sharpness of the marginal images, P is left with a negative value suited to the extent of the field to be represented; when calculating an objective of this sort intended to be provided with a collimating lens, the residual value ascribed to P will therefore have to be increased by varying the quantity $\phi \eta$.

I claim as my invention:

1. An objective for picture-taking and projection in color photography and cinematography of films goffered with lenticular refracting elements, comprising an objective proper embodying a lens system made up of a plurality of different elements, a trichrome color-selecting diaphragm-filter located in the objective intermediate said system in the path of the rays passing therethrough, and a collimating lens positioned substantially in the focal plane of the said objective and having a focal length such that the pupil of emergence of the original objective will be disposed in the anterior focal plane of said collimating lens, the objective proper, the diaphragm-filter and the collimating lens being disposed on the same optical axis.

2. An optical combination comprising an objective adapted for use with films having a goffered base in cinematography in colors, containing a lens system made up of a plurality of different elements, and a color selecting diaphragm-filter, and a collimator lens, so arranged that the pupil of emergence of said objective is in the anterior focal plane of the collimator lens.

3. An optical combination comprising an objective adapted for use with films having a goffered base in cinematography in colors, containing a lens system made up of a plurality of different elements, and a color selecting diaphragm-filter, and a collimator lens, so arranged that the pupil of emergence of said objective is in the anterior focal plane of the collimator lens, the latter being in the vicinity of the focal plane of said objective.

4. An optical combination comprising an objective adapted for use with films having a goffered base in cinematography in colors, containing a lens system made up of a plurality of different elements, and a color selecting diaphragm-filter, and a collimator lens, so arranged that the pupil of emergence of said objective is in the anterior focal plane of the collimator lens, the aberrations introduced by the collimator lens being corrected by compensating aberrations introduced into said objective.

5. An optical combination comprising an objective adapted for use with films having a goffered base in cinematography in colors, containing a lens system made up of a plurality of different elements, and a color selecting diaphragm-filter, and a collimator lens, so arranged that the pupil of emergence of said objective is in the anterior focal plane of the collimator lens, the latter being in the vicinity of the focal plane of said objective, the aberrations introduced by the collimator lens being corrected by compensating aberrations introduced into said objective.

6. An optical combination comprising an objective adapted for use with films having a goffered base in cinematography in colors, containing a lens system made up of a plurality of different elements, and a color selecting diaphragm-filter, and a collimator lens, so arranged that the pupil of emergence of said objective is in the anterior focal plane of the collimator lens, the aberrations comprising spherical aberration, aigrettes, astigmatism and curvature of the field, introduced by the collimator lens being corrected by compensating aberrations introduced into said objective.

7. An optical combination comprising an objective adapted for use with films having a goffered base in cinematography in colors, containing a lens system made up of a plurality of different elements, and a color selecting diaphragm-filter, and a collimator lens, so arranged that the pupil of emergence of said objective is in the anterior focal plane of the collimator lens, the latter being in the vicinity of the focal plane of said objective, the aberrations comprising spherical aberration, aigrettes, astigmatism and curvature of the field, introduced by the collimator lens being corrected by compensating aberrations introduced into said objective.

8. An optical combination comprising an objective adapted for use with films having a goffered base in cinematography, containing a lens system made up of a plurality of different elements, and a diaphragm, and a collimator lens, so arranged that the pupil of emergence of said objective is in the anterior focal plane of the collimator lens.

9. An optical combination comprising an objective adapted for use with films having a goffered base in cinematography, containing a lens system made up of a plurality of different elements, and a diaphragm, and a collimator lens, so arranged that the pupil of emergence of said objective is in the anterior focal plane of the collimator lens, the latter being in the vicinity of the focal plane of said objective.

10. An optical combination comprising an objective adapted for use with films having a goffered base in cinematography, containing a lens system made up of a plurality of different elements, and a diaphragm, and a collimator lens, so arranged that the pupil of emergence of said objective is in the anterior focal plane of the collimator lens, the aberrations introduced by the collimator lens being corrected by compensating aberrations introduced into said objective.

11. An optical combination comprising an objective adapted for use with films having a goffered base in cinematography, containing a lens system made up of a plurality of different elements, and a diaphragm, and a collimator lens, so arranged that the pupil of emergence of said objective is in the anterior focal plane of the collimator lens, the latter being in the vicinity of the focal plane of said objective, the aberrations introduced by the collimator lens being corrected by compensating aberrations introduced into said objective.

12. An optical combination comprising an objective adapted for use for goffered films in cinematography, containing a diaphragm and a collimator lens located between the objective and the film, so arranged that the pupil of emergence of the objective is in the anterior focal plane of the collimator lens.

In testimony whereof I affix my signature.

ANDRÉ OSWALD.